Figure 1:
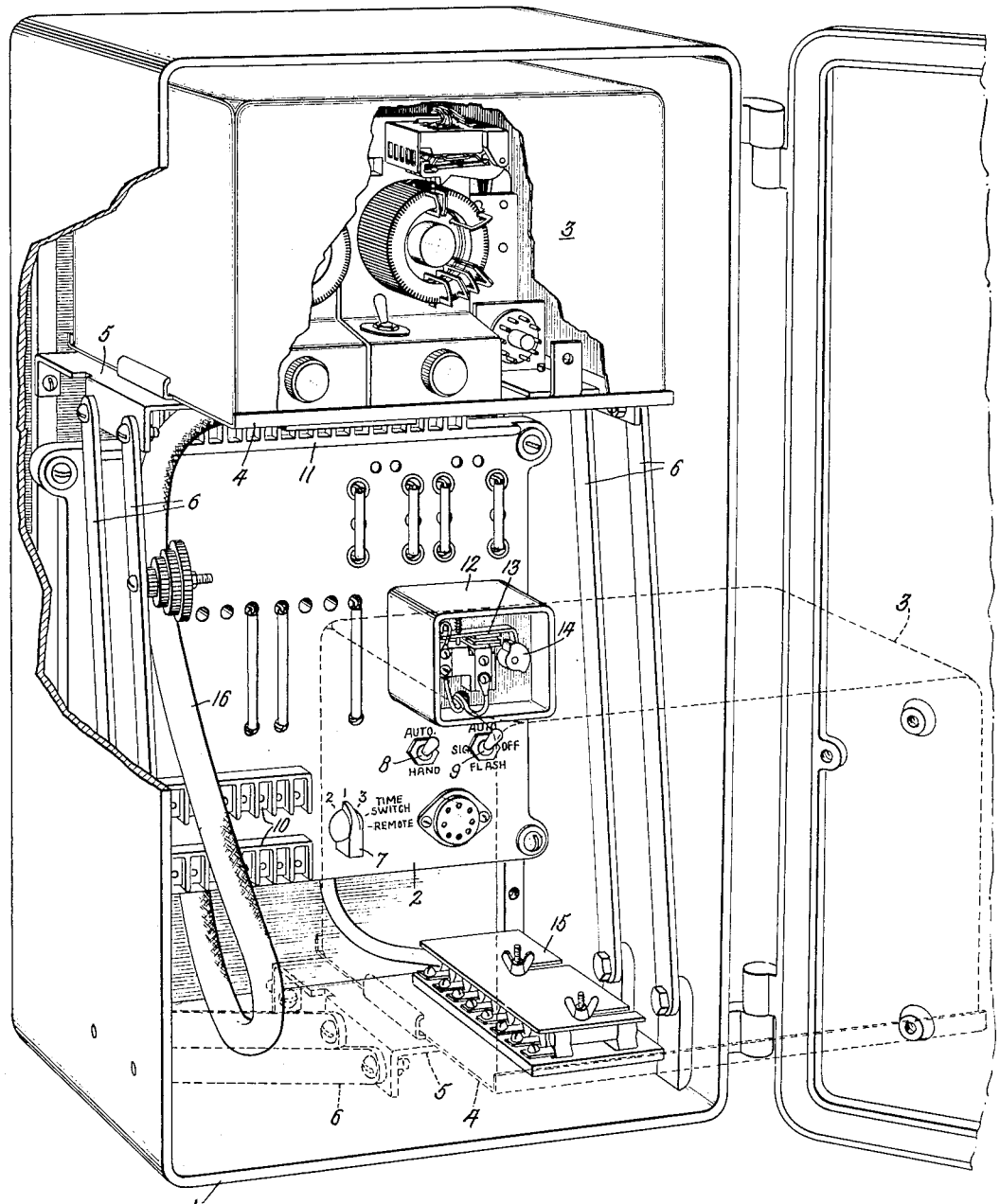

May 8, 1956 R. A. REID ET AL 2,745,086
TRAFFIC SIGNAL CONTROLLER
Filed March 17, 1951 5 Sheets-Sheet 1

Inventors:
Ralph A. Reid;
Vincent W. Leonard,
by Claude A. Moir.
Their Attorney.

Inventors:
Ralph A Reid;
Vincent W. Leonard
by Claude H. Mott
Their Attorney.

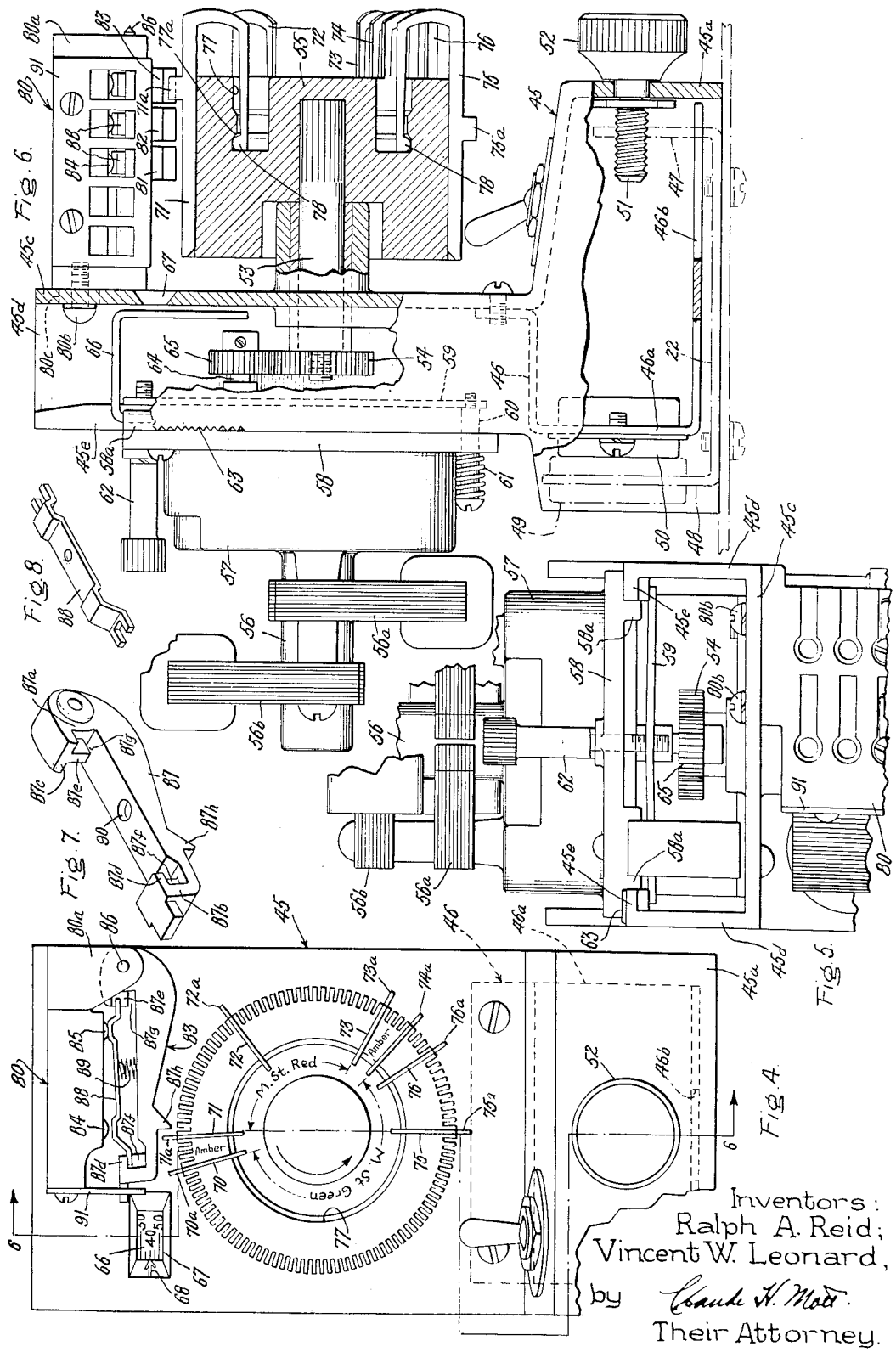

May 8, 1956  R. A. REID ET AL  2,745,086
TRAFFIC SIGNAL CONTROLLER

Filed March 17, 1951  5 Sheets-Sheet 4

Inventors:
Ralph A. Reid;
Vincent W. Leonard,
by *Claude H. Mott*
Their Attorney.

Inventors
Ralph A. Reid
Vincent W. Leonard,
by
Their Attorney.

United States Patent Office 2,745,086
Patented May 8, 1956

2,745,086

TRAFFIC SIGNAL CONTROLLER

Ralph A. Reid, Beverly, and Vincent W. Leonard, Saugus, Mass., assignors to General Electric Company, a corporation of New York Application March 17, 1951, Serial No. 216,124

6 Claims. (Cl. 340—40)

Our invention relates to signal controllers, and more particularly to traffic signal controllers of the pretimed type.

Traffic signal controllers of the subject type commonly include a rotatable signal sequence controller of the cam drum type having electro-responsive actuating means, and a continuously operable cyclic program timer for recurrently energizing the electro-responsive controller in accordance with a predetermined signal display program. The program timer comprises one or more timing contacts recurrently actuated by adjustable keys carried in a continuously rotating timing dial or drum. A traffic signal controller of this general type is disclosed and claimed in Patents 2,236,297, 2,236,298 and 2,236,299, issued to Ralph A. Reid on March 25, 1941.

Where the terms "timing dial" or "timing drum" are used hereinafter they designate the rotating dial or drum of a cyclic program timer such as referred to above, the term "timing dial" being used as generic to avoid confusion between a program timer drum and a signal sequence controller drum. Where the term "drum controller" is used hereinafter it refers to the signal sequence controller including a cam drum and its intermittently energized actuating means. The terms "signal timer" or "signal cycle timer" refer to the signal sequence controller and its controlling program timer or timers. Finally, the term "signal controller" is used to designate the complete apparatus for controlling a group of signals at an intersection, including the signal timer, a switchboard, necessary manual switches and relays, and a cabinet in which the whole is mounted.

It is a general object of our invention to provide an improved signal controller of the foregoing type which is flexible in its adjustment and application, rugged, yet simple in construction, and reliable in operation.

It is a more particular object of our invention to provide a new and improved signal timer which is composed entirely of integral and separable units each of which is simply and readily removable and replaceable for repair.

It is still another object of our invention to provide such a unitized signal timer which is readily expansible by inclusion of additional timing units to vary its possible signal control applications over a very wide range.

It is a further object of our invention to provide a traffic signal timer for such a controller having improved means for mounting a plurality of selectable program timers, or dial units, and a signal sequence controller actuated thereby.

It is still another object of our invention to provide, in such a multiple dial type of traffic signal controller, improved means for transferring control of the signal sequence controller from one to another program dial.

It is a more specific object of our invention to provide, in such a traffic signal controller, interlocking means for ensuring that transfer of the signal sequence drum from the control of one program timer to another occurs at only predetermined signal display positions of the controller drum.

Figure 2:
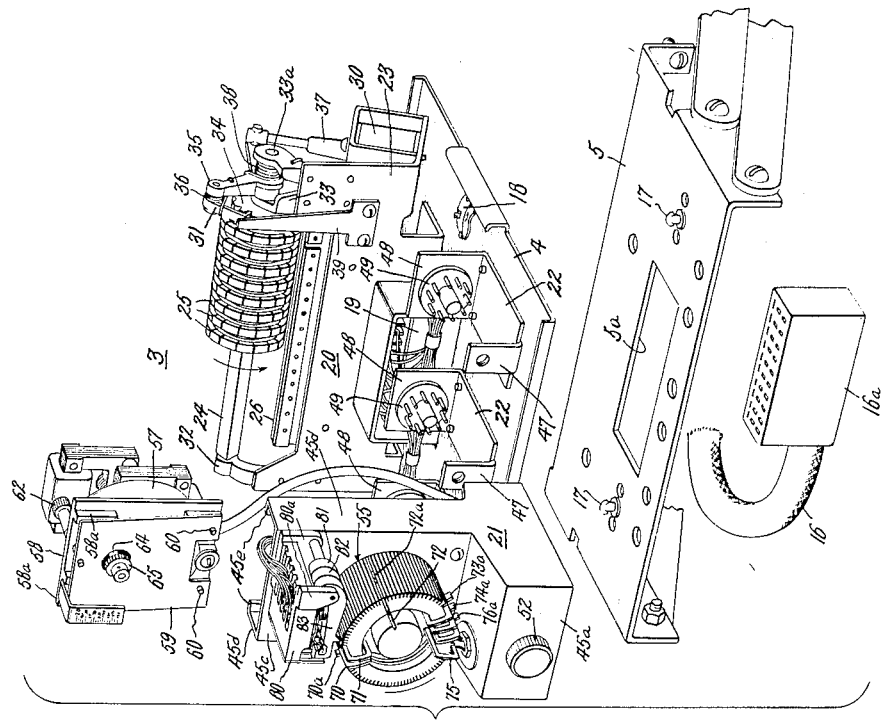
Figure 3:
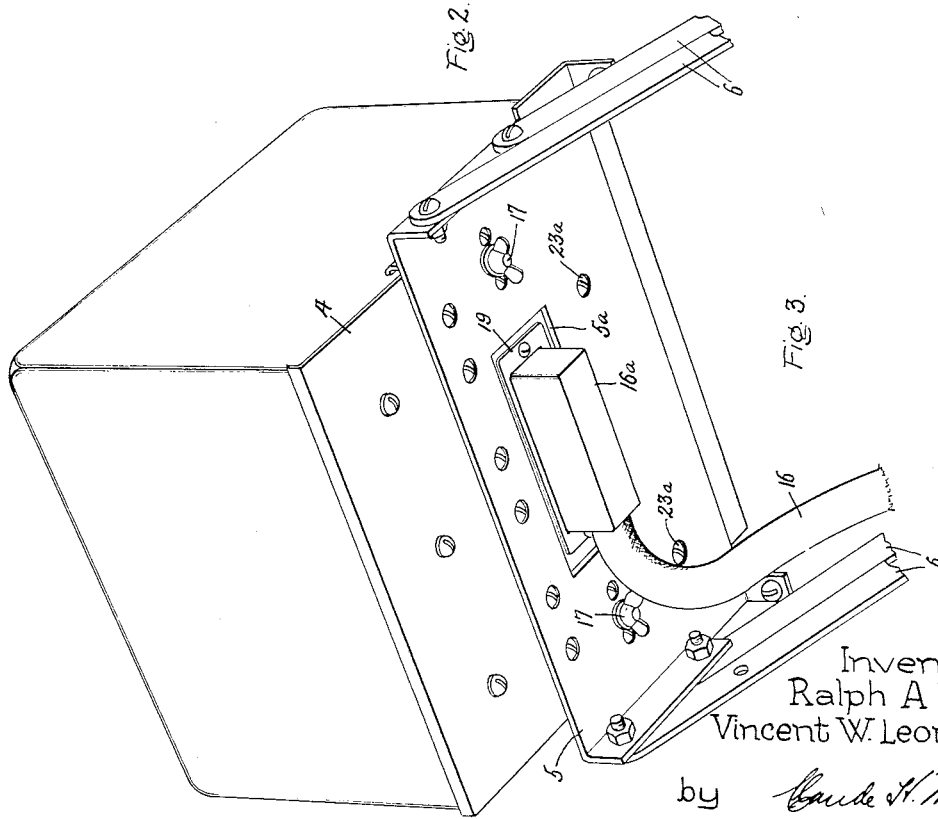
Figure 9:
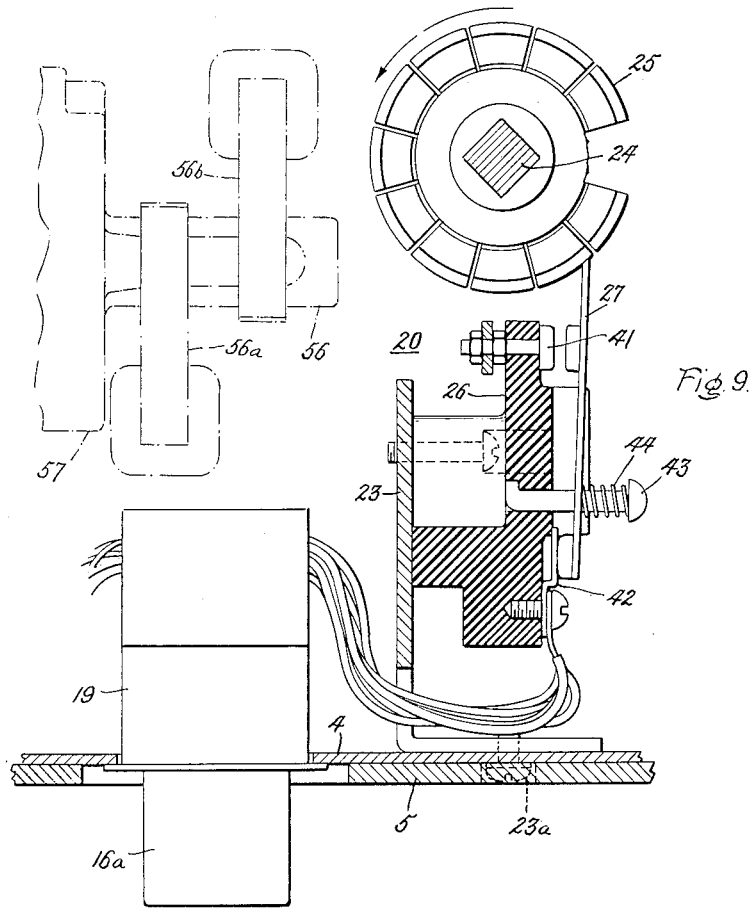
Figure 10:
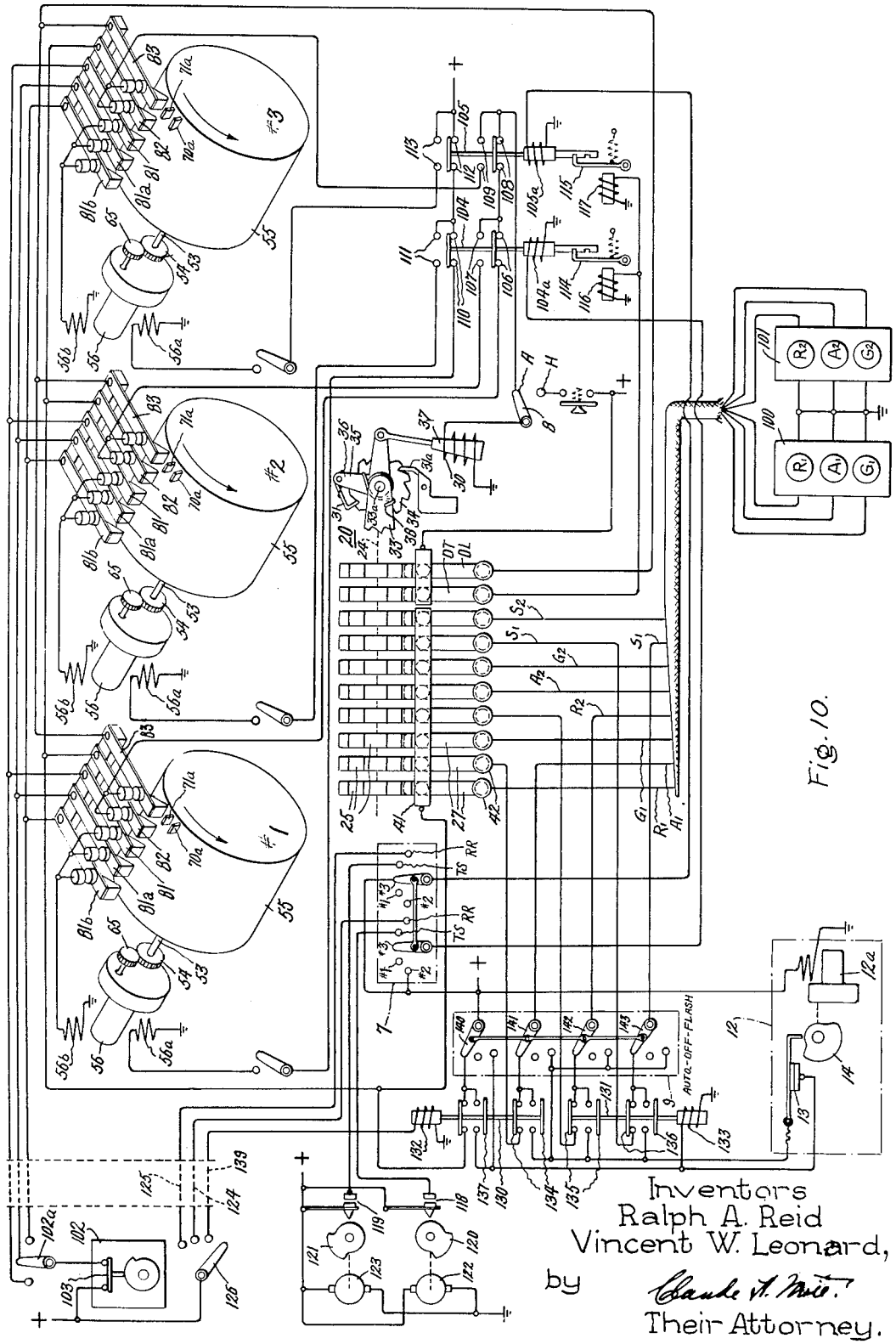

Our invention itself will be more fully understood and its various objects and advantages further appreciated by referring now to the following detailed specification taken in conjunction with the accompanying drawings in which Fig. 1 is a front view of our improved traffic signal controller showing the enclosure door open and the enclosure itself partially broken away; Fig. 2 is an exploded perspective view of the signal timer removed from its enclosing casing; Fig. 3 is a bottom view of the signal timer shown mounted upon its supporting shelf; Fig. 4 is a front elevational view of a single program cycle timer, or dial unit; Fig. 5 is a fragmentary top view of the program cycle timer; Fig. 6 is a cross-sectional view taken along the lines 6—6 of Fig. 4; Figs. 7 and 8 are perspective views of various parts of a disassembled program timer contact member; Fig. 9 is a transverse cross-sectional view of the signal sequence drum controller unit; and Fig. 10 is a schematic circuit diagram of connections of our improved traffic signal controller, including various remotely positioned control elements.

In carrying out our invention in one form, we provide a signal timer removably mounted as a unit within a controller cabinet. The timer itself comprises a number of separable units all removably mounted upon a single timer base. On this base is mounted an integral drum controller unit and one or more signal program timers, or dial units. The program timer units themselves are readily demountable and simply and easily adjustable to various desired program settings. In addition, interlocked selector means are provided to ensure that transfer of control from one to another program timer can occur only at predetermined drum controller positions, regardless of when in the cycle such transfer may be demanded.

Referring now to the drawings in detail, Fig. 1 is a front elevational view of a signal controller embodying our invention. The controller includes an enclosing casing 1 having mounted therein a switchboard 2 and a signal timer 3. The signal timer 3 is mounted upon a removable base plate 4 carried on a swingable shelf 5. The shelf 5 is mounted upon two pairs of pantograph links 6, and may be moved forwardly and downwardly out of the front opening of the casing by swinging movement of the pantograph links to a position shown in dotted lines at Fig. 1. The switchboard 2 is provided with selector switches 7, 8 and 9, the connections of which will be more fully described hereinafter in connection with Fig. 10. Also mounted upon the switchboard 2 are banks of terminal connectors 10 and 11 and a periodic flasher unit 12. The flasher unit 12 includes a flash switch 13 and an actuating cam 14 driven by an electric motor 12a (Fig. 10). The cam 14 is arranged periodically to actuate the switch 13 when the motor 12a is energized. A bank of fuses 15 is mounted in the lower part of the casing and a flexible connector 16 is connected between the switchboard 2 and the signal timer 3.

At Fig. 2 we have shown the signal timer 3 in partially exploded perspective view and removed from the supporting shelf 5. As best shown at Fig. 1, the signal timer comprises a number of self-contained timer elements all mounted upon the base plate 4. For simplicity, only one such timer has been shown at Fig. 2. The base plate 4 is adapted to be positioned upon the swingable shelf 5 and removably connected thereto by a pair of quarter turn fasteners 17 which are cooperable with a pair of resilient couplings 18 on the base plate 4. Mounted substantially centrally upon the timer plate 4 is an electrical plug connector 19 having a plurality of prongs extending downwardly through a central aperture in the plate 4. A corresponding aperture 5a is provided in the swingable shelf 5 through which the connector prongs extend into cooperative relation with a multiple receptacle 16a at the end of a cable 16.

The signal timer itself comprises a signal sequence or drum, controller unit 20 mounted upon the rear of the timer base behind the plug connector 19, and one or more program timing, or dial, units 21 mounted upon the forward side of the base plate 4 upon separating mounting brackets 22. While only a single program timer 21 is shown at Fig. 2 and two such timers are shown at Fig. 1, it will be understood by those skilled in the art that either one, two or three program timing units 21 may be mounted upon the timer base 4, each upon a separate U-shaped mounting bracket 22.

The signal sequence controller 20 is a self-contained unit including a supporting frame 23 fixed to the base plate 4 by bolts 23a and having mounted thereon a controller drum comprising a rotatable shaft 24 carrying a plurality of cams 25, a switch block 26 carrying a plurality of signal switches 27 (Fig. 9), an actuating solenoid 30, and a connecting linkage between the solenoid and the drum shaft 24 including a pawl 31.

The controller shaft 24 is of rectangular cross section and is rotatably mounted between a pair of brackets 32 and 33 fixed at opposite ends of the supporting bracket 23. The shaft 24 is provided at one end with an axial pin (not shown) journalled in the bracket 32. At its other end the shaft 24 is axially recessed and provided with an internal bearing which is journalled upon a pin 33a mounted in and extending beyond the bracket 33. The shaft 24 has slidably mounted on its rectangular portion a plurality of separate frangible cams 25 of the type described in Patent 2,236,397, issued to R. A. Reid, and carries at one end a ratchet wheel 34. The shaft 24 and cams 25 together constitute a cam drum.

The shaft journal bracket 33 is formed with two axially spaced apart arms between which is journalled upon the pin 33a a bell crank lever 35. The pawl 31 is pivotally mounted at one end of one of the bell crank arms and biased by means of a spring 36 into engagement with the ratchet wheel 34. To the other arm of the bell crank lever 35 is pivotally connected a plunger 37 for the solenoid 30. A coil spring 38 is positioned upon a hub of the bell crank 35 adjacent the bell crank lever 35. The coil spring 38 is connected at its ends to one arm of the journal bracket 33 and one arm of the bell crank lever 35 to bias the bell crank in a direction to rotate the drum shaft 24. A leaf spring 39 fixed to the mounting bracket 23 is positioned to serve as a resilient stop for the pawl 31. The pawl 31 is so disposed with respect to the ratchet wheel 34 that when the pawl is in engagement with the leaf spring 39, as shown at Fig. 2, the leaf spring 39 serves also to hold the pawl in position in a notch of the ratchet wheel. A second gravity actuated pawl 31a (Fig. 10) is mounted upon the bracket 33 beneath the ratchet wheel 34 to prevent reverse rotation of the ratchet wheel. The forward sides of the ratchet wheel teeth are inclined, so that when the solenoid 30 is energized and the bell crank lever 35 moved clockwise (as viewed at Figs. 2 and 10), the pawl 31 slides over one tooth of the ratchet wheel and comes to rest in the next adjacent slot. When the solenoid 30 is then de-energized, the biasing spring 38 rotates the bell crank lever 35 in a counterclockwise direction to its stopped position shown, and the bell crank carries with it the drum shaft 24 and cams 25. In this manner the drum controller is rotated between discrete signal display positions.

It will be noted from Fig. 2 that the solenoid plunger 37 is conical. This shape facilitates lateral displacement of the plunger within the axial coil aperture due to arcuate movement of the bell crank arm to which the plunger is attached. Preferably the plunger 37 is also provided with braking means effective near the end of its pick-up stroke. Such braking means may suitably be magnetic, as shown in Patent 2,182,685—Weiler.

Referring now more particularly to Fig. 9, it will be observed that the mounting bracket 23 for the signal sequence controller 20 also has separately mounted thereon a switch block 26 formed of electric insulating material, which has fixed thereto a plurality of pairs of spaced apart fixed contacts 41, 42. The switch block 26 is mounted upon the bracket 23 below the cam shaft 24, and has removably fixed thereto a plurality of movable bridging switch members 27, the upper ends of which extend into camming engagement with the associated drum cams 25. Each bridging switch 27 is positioned on the block 26 by a removable key 43, and is biased into contact engaging position by means of a spring 44 on the key 43. The switch members 27 are held out of engagement with the upper fixed contacts 41 by means of the drum cams 25, and are permitted to come into engagement with the associated contacts 41 in any position of the drum shaft where a particular switch member 27 encounters a broken out cam segment. This bridging contact construction is fully described in Patent 2,236,298, issued to R. A. Reid on March 25, 1941.

It will now be evident from the foregoing description of the signal sequence controller 20 that the signal drum comprising the shaft 24 and the cams 25 may be removed from the supporting bracket 23 by merely removing from the bracket 23 the bearing bracket 32 and sliding the drum shaft 24 off the pin 33a, the bearing brackets 32 and 33 being preferably fixed to the mounting bracket 23 by means of threaded bolts. Such removal of the cam drum may be accomplished without in any way affecting the mounting of the cam contact block 26 or the cam switches 27 fixed thereto, and without effecting any disassembly of the drum shaft driving linkage mounted on the pin 33a. Upon such removal, the cams 25 may be slipped endwise off of the drum shaft 24 for convenient break out of desired cam segments, or more cams may be added to the shaft. In assembled position, the cams 25 are held against the ratchet wheel 34 by any convenient clamping means (not shown) such as a shaft collar provided with a set screw or the like. In addition to the foregoing simple drum shaft removal, the shaft driving linkage may also be readily removed as an assembled unit by merely removing the bracket 33 upon which the entire driving unit is mounted.

Referring now more particularly to the program timing unit 21, we have shown at Fig. 2 only a single such program timer, and at Figs. 4, 5, 6, 7 and 8, we have shown various detailed views of such a timer. This program timing unit forms the subject matter of our divisional application Serial No. 279,144 filed March 28, 1952, entitled Cyclic Program Timer, and assigned to the same assignee as the instant application.

Each program timer 21 is formed as an integral unit mounted upon an L-shaped cast frame 45 having a rectangular channel-shaped upright portion and a hollow base portion. Referring more particularly to Fig. 6, each program timer frame 45 has a base portion formed to provide a front wall 45a, and is provided internally with a bracket 46 forming a back wall 46a in parallel spaced relation with the front wall 45a. In addition the base portion of the frame 45 has an apertured bottom wall formed by the bracket 46 and cut away at 46b to permit reception within the frame base of an upright arm 47 on the timer mounting bracket 22. As shown at Figs. 2 and 6, the program timer mounting brackets 22 are U-shaped and each provided with spaced apart upright arms 47 and 48. The program timer frame 45 is placed over the associated mounting bracket 22 so that the upright arms of the bracket 22 are adjacent the forward and rear walls 45a and 46a of the frame base, the arm 47 being intermediate the walls 45a and 46a and adjacent the inner side of the front wall 45a, and the arm 48 being adjacent the outer side of the rear frame wall 46a. A multiple prong electric plug 49 is mounted upon the upright bracket arm 48 with its prongs extending inwardly and parallel to the bight portion of the mounting bracket 22. A cooperating electric receptacle 50 is mounted upon the rear wall 46a of the base of the program timer frame 45 in position to be drawn into electrical contacting engagement with the plug 49 by horizontal rearward movement of the timer frame 45. For the purpose of attaching the timer frame 45 to the mounting bracket 22 and drawing the electric connectors 49 and 50 into contacting engagement, a connecting bolt 51 is rotatably mounted in the front wall 45a of the timer frame and provided externally with a knurled knob 52. The bolt 51 cooperates with a threaded aperture in the upright bracket arm 47. It will, of course, be appreciated by those skilled in the art that the upright arms 47, 48 of each U-shaped bracket 22 may, if desired, be separately formed and attached to the plate 4.

The upright channel-shaped portion of the program timer frame 45 is provided with a front panel 45c and side walls 45d having inturned rear end portions 45e forming a trackway. Journaled in the front panel 45c of the program timer frame 45 is a rotatable shaft 53. The shaft 53 extends through the panel 45c and has fixed thereto at its rear end and between the side walls 45d of the channel-shaped frame a driven gear 54. On the front side of the panel 45c, the timing shaft 53 has fixed thereto a timing drum i. e., dial 55. The timing dial 55 is preferably milled out of an integral piece of metal stock and is of a cylindrical formation which will be more fully described hereinafter. The cylindrical dial 55 is continuously driven through the driven gear 54 by means of a program timing motor 56 having an integrally connected gear box 57 and mounted upon the program timer frame 45 behind the front panel 45c. The motor 56 and its connected gear box 57 are fixedly mounted upon a motor mounting panel, or plate, 58 which is slidably mounted upon and clamped to the frame trackway formed by the inturned ends 45e of the frame side walls 45d. For this purpose the motor panel 58 is provided, on the side opposite the motor 56, with a pair of spaced apart elongated spacing lugs 58a. The spacing lugs 58a are spaced apart by just a sufficient distance to fit between the inturned ends 45e of the frame side walls 45d.

In parallel spaced relation with the motor panel 58 and spaced therefrom by the lugs 58a, there is fixed to the motor panel a clamping plate 59. The clamping plate 59 is loosely mounted upon a pair of mounting studs 60 (Figs. 2 and 6) at the lower end of the motor panel 58 and is biased by means of helical springs 61 on the studs 60 so that the clamping plate is held against the lugs 58a on the motor panel. A clamping bolt 62 is loosely mounted in the upper end of the motor panel 58 and arranged for threaded engagement with a cooperating threaded aperture in the clamping plate 59 to clamp the motor panel in position on the frame trackway. It will be evident that the motor panel 58 and connected clamping plate 59 embrace between them the trackway formed by the inturned ends 45e of the channel-shaped frame, and that when the clamping bolt 62 is drawn up, the motor panel is clamped in position upon this trackway. To ensure proper mesh of the gears 54 and 65, one side of the trackway 45e and one side of the motor panel 58 are provided with interfitting serrations as at 63 (Fig. 6). These serrations are so spaced that the gears are in proper meshing relation when the gears are as close together as possible with the serrations in interfitting relation.

Connected to the motor 56 through the gear box 57 is a driving shaft 64 which extends through the motor panel 58 and clamping plate 59 and carries at its extending end a driving gear 65. With the motor panel positioned on the frame as described, the driving gear 65 is positioned between the side walls 45d of the timer frame 45 and in driving relation with the driven gear 54. With the gears in operative driving relation, the motor panel 58 is clamped in place.

The foregoing operative position of the motor panel is indicated in terms of cycle time by means of an indicating bracket 66 fixed upon the motor panel and having a calibration visible from the front of the front frame panel 45c through a window 67 in the front panel. An indicating mark 68 upon the front panel adjacent the window 67 is operative in conjunction with the calibrations upon the indicating bracket 66 to show the cycle time for which the timer is adjusted. It will be understood that by changing the size of either the driving gear 65 or the driven gear 54, the cycle time of the program drum 55 may be changed and such change will be reflected in a change in operative position of the motor panel 58 and a consequent change in position of the indicating bracket 66. In preferred form, we contemplate that the driven gear 54 shall be changeable, and a variety of such gears of varying size are shown stacked upon one of the pantograph links 6 at Fig. 1.

The driving motor 56, 57 is preferably a self-starting synchronous motor of the type disclosed in U. S. Patent 1,430,867, issued to H. E. Warren. It comprises the tubular motor casing 56 attached to the larger speed reducing gear casing 57. The speed reducing gears drive the shaft 64 which is referred to herein as the driving shaft. The motor disclosed herein is a modification of the motor described in the above Warren patent in that the casing 56 is lengthened and two armatures are provided on the shaft therein. One of the armatures cooperates with a field 56a to produce a torque in one direction, and the other armature cooperates with the field 56b to produce an equal and opposite torque. If only the field 56a is energized, the motor will run to drive the program drum 55 in a counterclockwise direction as viewed at Fig. 4, and this field 56a is thus known as the motor field. If both fields are simultaneously energized, equal and opposite torques are produced upon the armature shaft, and the motor comes to rest. Thus the field 56b is herein referred to as the braking field.

The program timing dial 55 is shown in detail at Figs. 4 and 6. The dial is of cylindrical or drum-like configuration and provided with a plurality of axial slots around its external periphery, within which are adapted to be selectively mounted any desired number of resilient hairpin shaped actuating keys 70, 71, 72, 73, 74 and 76. Each contact actuating key 70 to 76, inclusive, is provided with a radially extending contact actuating ear or projection 70a to 76a, respectively.

To receive the keys 70 to 76, inclusive, and hold them locked in place, the timing drum 55 is provided at the front with a reentrant annular recess 77 which is ridged on its outer peripheral surface to form an annular locking shoulder 77a. As most clearly shown at Fig. 6, each contact actuating key 70 to 76, inclusive, is a flat U-shaped strip of resilient material having a long side arm and a short side arm. The long side arm carries the contact actuating projection and when in operative position in the drum is substantially wholly embedded for substantially its entire length in one of the axial drum slots, the contact actuating projection extending beyond the surface of the drum. The short side arm of the key is provided at its end with a spring nib or detent 78 which springs into latching engagement with the locking shoulder 77a to retain the key in operative position. By thus positioning each actuating key in a long axial slot of a cylindrical timing drum and latching the keys in place, the keys are held firmly so that accurate timing is obtained.

For cooperation with the contact actuating keys 70 to 76, inclusive, in the timing drum 55, there is mounted upon the front panel 45c of the program timer frame 45 a contact block 80. The contact block 80 is formed of any suitable electric insulating material, and has pivotally mounted thereon a plurality of movable contact members 81, 82 and 83. These contact members are disposed substantially tangentially to the program timing drum 55 and positioned in the paths of the various actuating key projections 70a and 76a for actuation thereby. More specifically, the keys 70, 71, 73, 74 and 76 actuate the contact member 83; the key 75 actuates the contact member 82, and the key 72 actuates the contact member 81. The contact block 80 is substantially rectangular and provided with a lower flat surface extending substantially perpendicular to the front frame panel 45c. A plurality of fixed contact members 84, 85 are fixed in the block 80 at its lower surface in spaced apart rows adjacent opposite ends of the contact arms 81, 82, 83. The movable contact arms 81, 82 and 83 are each pivotally mounted at one end upon a fixed pivot pin 86 which is fixedly mounted in the contact block 80 between spaced apart depending ears 80a and in substantially parallel spaced relation with the lower fixed contact surface of the block. The entire contact block 80 is fixed to the panel 45c by means of bolts 80b. At least one of the bolts 80b is adjustable in a slot 80c in the panel 45c, thereby to permit adjustment of the entire contact block 80 with respect to the dial 55.

The construction of the movable contact members 81, 82 and 83 is best shown at Figs. 4, 7 and 8. Each movable contact member comprises a U-shaped contact arm 87 elongated in the direction of its bight portion and having short parallel side portions 87a and 87b inturned at their upper end, as at 87c and 87d. Between the inturned end portions 87c and 87d, each contact arm 87 is formed to provide a pair of coplaner webs 87e and 87f respectively, the web 87f extending for the whole distance between the bight of the arm and the inturned stop 87d, and the web 87e terminating short of the bight portion of the contact arm to provide a lateral slot 87g. Preferably, the contact arms 87 are formed of a molded plastic insulating material. Within each movable contact arm 87, parallel to its bight portion and between its short side portions is disposed an elongated bridging contact bar 88 of electric conducting material. The bridging contact bar 88 is slotted, or bifurcated, at its ends to fit slidably over the webs 87e and 87f, the bar 88 being inserted between the webs by sliding its one end into the slot 87g and upwardly on to the web 87e. The bridging contact bar 88 is biased away from the bight portion of the arm 87 and against the inturned ends 87c and 87d of the side arms by means of a compression spring 89 disposed substantially centrally of the contact member between the contact bar 88 and the bight portion of the contact arm 87. The spring 89 is held in position by seating at one end in a recess 90 in the contact arm 87 and at the other end over a projection 88a pressed out of the bridging contact bar 88.

Each movable contact arm 87, being pivotally mounted upon the contact block 80 as described, extends substantially parallel to the lower surface of the block in operative relation with the associated pair of fixed contacts 84 and 85. The free end of each movable contact arm 87 fits into a rectangularly apertured or slotted positioning plate 91 attached to the block 80, and is so positioned by the plate 91 that, in the normal dropped out position, each bridging contact bar 88 is held in engagement with the associated fixed contact 85 (nearest the pivot pin 86) and spaced from the associated fixed contact 84. Each movable contact arm 87 is further provided intermediate its ends with a depending camming projection 87h which extends into the path of the movement of certain of the actuating projections 70a to 76a, inclusive, on the actuating keys 70 to 76, inclusive. The operative relationship of the various keys and contact arms has been described hereinbefore.

The structure of the dial contact arms 81, 82 and 83 on the block 80 is the subject of a copending patent application Serial No. 212,383, filed on February 23, 1951, by Vincent W. Leonard, assigned to the same assignee as the instant application, and subsequently issued as Patent 2,644,047 on June 30, 1953.

In the particular embodiment of the invention shown, the program timing dial 55 is provided with 100 slots, and the contact block 80 carries three movable contact members. Space is provided on the contact block for the provision of two additional contact members. The actuating projections 70a to 76a, inclusive, on most of the actuating keys are aligned with the contact member 83. A single key 75 is provided with an actuating projection aligned with the contact member 82, and a single key 72 is provided with an actuating projection aligned with the contact member 81. Similarly if two additional contact members are provided, single special actuating keys for these contact members are additionally provided, as will more fully appear hereinafter from the description of the schematic circuit diagram (Fig. 10) wherein the entire five contact members have been shown.

The operation of our improved traffic signal controller will now be more fully understood by referring to the schematic circuit diagram as shown at Fig. 10. In this diagram we have illustrated three program timing units designated as #1, #2 and #3, each provided with five dial contacts and connected selectively to control the signal sequence drum controller 20. At Fig. 10, all parts corresponding to those previously described have been assigned like reference numerals.

On each program timer at Fig. 10, the dial contacts have been identified as 83, 82, 81, 81a and 81b. The entire controller is shown connected to two sets of signal lights, 100 and 101. Each set of lights contains a red light, an amber light and a green light, and it is contemplated that the two sets will be disposed to control traffic on two intersecting traffic lanes. The various red, amber and green lights have been identified as $R_1$, $A_1$, $G_1$, $R_2$, $A_2$, and $G_2$, and are connected, respectively, through suitable similarly identified wires to corresponding signal switches 27 of the signal circuit controller 20. A pair of extra or spare wires $S_1$, and $S_2$ are shown. These may be used to control auxiliary circuits such as turn indicators, walk lights, and the like. If it is desired to make the controller optionally applicable to a three or more street intersection, additional spare drum switches may be provided.

The controller illustrated at Fig. 10 is assumed to be an intersection controller, and is arranged to be maintained in synchronism with a master controller 102 positioned at a remote point. The master controller includes a cam contact 103 which is normally closed and opened momentarily once per cycle of the master timer as described in Patent 2,236,298. The master controller contact 103 is connected in a synchronizing circuit with the program timer motor brake coils 56b through a normally open program dial contact which is closed momentarily once per cycle, as described in the foregoing patent. The synchronizing arrangement shown at Fig. 10 is a modification of that shown in Patent 2,236,298 in that each program timer is provided with three selectable synchronizing contacts 81, 81a and 81b, only one of which is selected for use at any one time by means of a manually operable selector switch 102a. By this arrangement, and by suitable positioning on the program timing dial of the actuating keys for the selectable synchronizing contacts, the program drums may be maintained in any one of three phase displaced, or offset, synchronous relationships with the master timer. The synchronizing circuit of Fig. 10 is further modified over that shown in the foregoing patent in that three such selectable synchronizing circuits are shown in parallel circuit relation, one for each of the program timers #1, #2 and #3. It will, of course, be understood by those skilled in the art that it is not necessary to operation that a plurality of selectable synchronizing circuits be provided. If desired only a single master synchronizing circuit need be provided, with the three program timers #1, #2 and #3 each having only a single synchronizing contact (as the contacts 81) and having their brake coils connected through such contacts in parallel to the single synchronizing circuit.

The dial contacts 82 and 83 of each program timer are normally open, and are connected to advance the drum of the signal circuit controller 20 in the same manner as the corresponding contacts 130 and 140 of Patent 2,236,298. That is, each contact 83 normally serves as a "drum advance" contact by completing a circuit through the drum controller solenoid actuating coil 30 for each position of the drum controller except one predetermined position in which the solenoid circuit is opened at a "drum lock" switch DL (Fig. 10) of the drum controller. In this drum position, it is necessary that the "drum release" contact 82 be closed in order to advance the drum. By this means the signal circuit controller 20 is maintained in step with its controlling program timer.

The drum advance and drum release contacts 82 and 83 of the various program timers are arranged to be selectively connected in circuit with the drum controller solenoid 30 through a pair of selector relays 104 and 105. For this purpose, the relay 104 is provided with a pair of normally closed contacts 106 and a pair of normally open contacts 107, and the relay 105 is provided with a pair of normally closed contacts 108 and a pair of normally open contacts 109. As illustrated at Fig. 10, when both relays 104 and 105 are de-energized, the drum controller solenoid 30 is connected through the contacts 106 and 108 to the contacts 82 and 83 of the program timer #1. When the relay 104 alone is energized the drum solenoid 30 is similarly connected for control by the program timer #2 through the relay contacts 107 and 108. When the relay 105 alone is energized, the drum solenoid 30 is in like manner connected for control by the program timer #3 through the relay contacts 109. It will, of course, be understood that for all these connections, the manually operable switch 8 must be in its "automatic" position A.

The selector relays 104 and 105 also control the connection of the program timer motor coils 56a, to effect energization of the motor coil of that program timer which is selected to control the drum solenoid 30. For this purpose the relay 104 is provided with a pair of normally closed contacts 110 and a pair of normally open contacts 111, and the relay 105 is provided with a pair of normally closed contacts 112 and a pair of normally opened contacts 113. These motor selector contacts operate simultaneously with and in a manner entirely similar to the dial selector contacts 106 to 109 inclusive.

To control the condition of energization of the selector relays 104 and 105, and thus to provide selection between the various program timers #1, #2 and #3, the manually operable selector switch 7 is provided. When this switch 7 is in the position marked #1, both relays 104 and 105 are de-energized and timer #1 is connected to control the drum controller 20. When the switch 7 is in the position marked #2, the actuating coil 104a of the relay 104 is energized, and when the switch 7 is in the position marked 3, the actuating coil 105a of the relay 105 is energized, thereby to select the program timers #2 and #3, respectively.

Means are provided to ensure that, regardless of when during a signal cycle the selector switch 7 is moved from one position to another, transfer operation of the selector relays 104 and 105 will take place only at certain predetermined signal display positions of the drum controller 20. For this purpose the relays 104 and 105 are normally held locked or disabled in both their picked-up and dropped-out positions by latches 114 and 115, respectively. The latches 114 and 115 are adapted to be released electro-magnetically by means of latch release coils 116 and 117, respectively. The coils 116 and 117 are connected in parallel circuit relation to a source of power through a "dial transfer" switch DT on the signal circuit drum controller 20. The drum cam associated with the transfer switch DT is so broken out that the switch DT is closed only in one or more predetermined drum positions, preferably in positions where the drum contacts establish circuits for the main street green signal lights. Such a position may occur once or more than once per revolution of the drum, depending upon the total number of drum positions provided, as will be more fully described hereinafter. Thus, even though one or the other of the selector relay actuating coils 104a and 105a is energized through the selector switch 7, transfer of connections by these relays cannot take place until the latch release coils 116 and 117 are energized in a predetermined signal drum position or positions.

Preferably the dial transfer switch DT is arranged to close for only a short time at the beginning of each main street green interval. This may be accomplished by providing two consecutive positions of the signal drum controller 20 for each main street green, the drum circuits being the same in each position except that the drum transfer switch DT is closed for an initial part of main street green (first of the two positions) and opened for the remainder of this signal interval (second of the two positions). The drum is advanced between these two positions by a special "dial transfer" key 76 positioned in the dial 55 within the main street green program interval and engaging the drum advance contact 83. This means that transfer of the drum controller 20 from the control of one program timer to another will always occur at the beginning of a main street green interval. Because of the drum transfer key 76 this is true even though the selector switch 7 is reset during a main street green interval since the selector relays 104 and 105, through their contacts 110—113, ensure that non-selected program timers are stopped at the beginning of their main street green intervals. Thus, whenever any program timer is selected to control the signal drum, the timer is started at the beginning of its main street green interval with the signal drum in its main street green position. This is a highly desirable condition to maintain for all timer transfers, since it results in a minimum interruption with traffic.

It will now be understood that if the drum controller 20 is set up with only a single position for each main street green display, the dial transfer switch DT on the controller 20 will be closed all during main street green. In such case dial transfer will occur at the beginning of main street green except when the selector switch 7 is reset during a main street green interval.

The selector switch 7 is provided with two additional positions (other than #1, #2 and #3) designated "TS" and "RR." In the TS position, the selector relay actuating windings 104a and 105a are connected to be controlled by a pair of time switches 118 and 119, respectively. These time switches 118 and 119 are provided with actuating cams 120 and 121, respectively, which are driven respectively by timing motors 122 and 123. These time switches may be located either locally or remotely, but are preferably located within the local controller cabinet 1, such as by mounting upon the rear side of the cabinet door.

In the "RR" position of the selector switch 7, the selector relay actuating windings 104a and 105a are connected through a pair of inter-connecting wires 124 and 125, respectively, to a selector switch 126 at the master timer, so that selection of the operative program timer #1, #2 or #3 may be made at the master station. The manual dial selector switch 7 has complete precedence over the dial selector time switches 118 and 119.

Finally, the flasher device 12 is arranged to be connected in control of the signal lights by either the local manual selector switch 9 or the selector switch 126 at the master timer. As previously described, the flasher device 12 includes a driving motor 12a, a flasher contact 13, and a continuously rotatable actuating cam 14 arranged to produce periodic opening and closing movement of the switch 13 when the motor 12a is energized.

In conjunction with flasher operation, we provide a pair of flash relays 130 and 131 having actuating windings 132 and 133 respectively. The flash relay 130 is provided with bridging contacts 134 and the flash relay 131 is provided with bridging contacts 135 and 136 which, upon energization of the relays, disconnect the wires $S_1$, $R_2$ and $A_1$ respectively from their controlling signal drum contacts and reconnect these wires to the flasher switch 13, and through this switch and a normally open contact 137 on relay 130 to a source of electric current supply. The actuating winding 132 of relay 130 is connected to be energized through the selector switch 126 at the master controller over an interconnecting wire 139. Upon closure of the proper contact of the master selector switch 126, the flash relay actuating winding 132 is energized to pick up the relay 130. When the relay 130 picks up, it closes its contact 137 to complete an energizing circuit from local power for the actuating winding 133 of the relay 131. Thus the relays 130 and 131 act substantially simultaneously, one picking up the other. For such operation the selector switch 9 must be in its "automatic" position shown at Fig. 10.

The flasher device may also be connected in circuit by positioning of the local manual selector switch 9 in its "flash" position. This switch is provided with four contact arms 140, 141, 142 and 143. When the switch 9 is in its "flash" position, the contact arm 140 removes positive power from the cam switches of the signal circuit drum controller 20 and applies positive power to one side of the flasher switch 13, and the contact arms 141, 142 and 143 disconnect the signal wire $A_1$, $R_2$ and $S_1$ respectively from the controller drum contacts and connect these wires to the other side of the flasher switch 13. In this operation the flash relay 131 is picked up, but its operation does not affect the signal circuits.

In addition, it will now be evident to those skilled in the art that an automatic time switch, either at the master controller or at the local controller, may be substituted for the flash contact on the master selector switch 126. It should only be noted that no local time switch control of flash operation should be provided whenever any master control (time or manual) of flash operation is provided, unless the master and local power supply sources can be interconnected without damage.

It will now be noted that if a local flash time switch is provided, the selector switch 9 may be operated to call for "flash" operation even though such local time switch is calling for automatic stop and go operation (i. e., is open). On the other hand the selector switch 9 cannot be operated to ensure automatic stop and go operation if either a local flash time switch or master flash switch is positioned to call for flashing operation. Thus, any master flash switch takes complete precedence over the local flash selector switch 9 to ensure flashing operation of the whole interconnected system of controllers, and the local manual switch 9 takes partial precedence over a local flash time switch, if provided.

In the particular embodiment of the invention which we have shown by way of illustration, we have shown 12 signal display positions on the drum of the signal circuit controller 20, and 100 program slots in each program timer drum 55. Since a simple signal sequence does not commonly require 12 different signal display positions, it is possible to set up the signal sequence more than once upon the controller drum of the signal circuit controller 20. This is done by suitable breaking out of the frangible cams 25. With such a break-out arrangement, the program keys in the program timing dials 55 are arranged so that one complete revolution of a timing dial 55 produces less than a complete revolution of the signal circuit controller drum. For example, as indicated at Fig. 4, the timing dial 55 is provided with only seven keys, one of which is a synchronizing key. Thus only six of the keys advance the drum of the signal circuit controller 20. With this arrangement one revolution of the program timer dial 55 corresponds to one-half a revolution of the signal circuit controller drum. The signal sequence, therefore, is set up twice on each signal circuit cam 25. With this arrangement, there are two positions of the signal circuit controller drum wherein the main street green signal lamp is energized. By suitable break-out of the associated cam 25, the dial transfer switch DT may be arranged to be closed in both of these main street green positions. If two consecutive drum positions are used for each main street green display, as previously described, the switch DT is closed only in the first of each pair of positions.

It will be further evident to those skilled in the art that, if desired a drum controller having more or less than 12 positions may be provided, and that in any case the number of keys in the timing dial determines the revolution ratio of dial and drum. The particular signal sequence selected determines the number of necessary keys in the dial, and additional keys may be added to produce an integral number of drum revolutions per dial revolution.

While we have shown and described only a preferred embodiment of our invention by way of illustration, many modifications will occur to those skilled in the art and we, therefore, wish to have it understood that we intend in the appended claims to cover all such modifications as fall within the true spirit and scope of our invention.

What we claim as new and desire to secure by Letters Patent of the United States is:

1. In a traffic signal controller, a rotatable signal controller including a plurality of switches, electro-responsive means connected to rotate said controller through a plurality of discrete signal display positions, said signal display positions determining a signal display sequence for a plurality of intersecting traffic lanes and including at least one pair of consecutive positions in which right of way is accorded to a predetermined one of said traffic lanes, a plurality of cyclic program timers each including a driving motor and a pair of contacts recurrently actuated, switching means for selectively connecting the contacts of a desired one of said timers to control said electro-responsive means, and means controlled by said signal controller for rendering said switching means operable only in the first of each said pair of consecutive signal display positions.

2. In a traffic signal controller, a rotatable signal controller including a plurality of switches, electro-responsive means connected to rotate said controller through a plurality of discrete signal display positions, said signal display positions determining a signal display sequence for a plurality of intersecting traffic lanes and including at least one pair of consecutive positions in which right of way is accorded to a predetermined one of said lanes, a plurality of cyclic program timers each including a pair of contacts recurrently actuated, first switching means for selectively connecting the contacts of a desired one of said timers, to control said electro-responsive means, second switching means coupled to said first switching means and connected to energize only the selected program timer, and means controlled by said signal controller and including one of said switches thereof for rendering said first and second switching means operable only when said signal controller is in the first of each said pair of consecutive signal display positions.

3. In a traffic signal controller, a rotatable signal controller including a plurality of switches, electro-responsive means connected to rotate said controller through a plurality of discrete signal display positions to control said switches, said signal display positions determining a signal display sequence for a plurality of intersecting traffic lanes and including at least one pair of consecutive positions in which right of way is accorded to a predetermined one of said lanes, a plurality of cyclic program timers each including a pair of contacts recurrently actuated, first switching means for selectively connecting the contacts of a desired one of said program timers to control said electro-responsive means, second switching means coupled to said first switching means and connected to energize only the selected program timer, means for normally disabling said first and second switching means, and means controlled by said signal controller and including one of said switches thereof for rendering said disabling means ineffective only when said signal controller is in the first of each said pair of consecutive signal display positions.

4. In a traffic signal controller, a rotatable signal controller including a plurality of signal switches, electro-responsive means connected to rotate said controller through a plurality of discrete signal display positions, said signal display positions determining a predetermined signal display sequence for a plurality of intersecting traffic lanes and including at least one pair of consecutive positions in which right of way is accorded to a predetermined one of said traffic lanes, a plurality of continuously rotatable electro-responsive cyclic program timers each including a pair of contacts actuated recurrently to determine predetermined intervals within a single program cycle, first switching means for selectively connecting the said contacts of a desired one of said program timers to control said electro-responsive means, means for maintaining each said program timer in step with said signal controller whereby each program interval is associated with a predetermined controller position and signal display, second switching means coupled to said first switching means and connected to energize only the selected program timer, and third switching means controlled by said signal controller for rendering said first and second switching means operable only when said signal controller is in the first of each said pair of consecutive signal display positions.

5. In a traffic signal control system, a rotatable signal controller including a plurality of cam members and a plurality of signal switches operated by a number of said cam members, electro-responsive means connected to rotate said controller through a plurality of discrete signal display positions determined by the operation of said signal switches by their associated cam members, a plurality of cyclic timers each including a pair of contacts recurrently actuated, switching means for selectively connecting the contacts of a desired one of said timers to control said electro-responsive means, means for normally disabling said switching means, and means engaged by one of said cam members of said controller and directly responsive to its position in one of the signal display positions of said controller for rendering said disabling means ineffective.

6. In a traffic signal controller, a rotatable signal controller including a plurality of signal switches selectably operated in different signal display positions of said controller and a transfer switch which is operated in direct response to the location of said controller in a particular one of its signal display positions, electro-responsive means connected to rotate said controller through its said signal display positions, a plurality of continuously rotatable electro-responsive cyclic program timers each including a driving motor and a pair of contacts actuated recurrently to determine predetermined intervals within a single program cycle, first switching means selectively connecting said contacts of a desired one of said program timers to control said electro-responsive means, means for maintaining each said program timer in step with said signal controller whereby each program interval is associated with a predetermined controller position and signal display, second switching means coupled to said first switching means and connected to energize only said desired one of said program timers, and means responsive to the operation of said transfer switch of said controller for rendering said first and said second switching means operable.

References Cited in the file of this patent

UNITED STATES PATENTS

| | | |
|---|---|---|
| 2,133,157 | Turner et al. | Oct. 11, 1938 |
| 2,182,984 | Hacmac | Dec. 12, 1939 |
| 2,194,310 | Leonard | Mar. 19, 1940 |
| 2,234,668 | Davenport | Mar. 11, 1941 |
| 2,236,298 | Reid | Mar. 25, 1941 |
| 2,244,299 | Johnston et al. | June 3, 1941 |
| 2,314,225 | Leece | Mar. 16, 1943 |
| 2,432,120 | Neill | Dec. 9, 1947 |
| 2,436,746 | Drought | Feb. 24, 1948 |
| 2,566,253 | Schmitter | Aug. 28, 1951 |
| 2,577,296 | Alles | Dec. 4, 1951 |
| 2,624,793 | Pearson | Jan. 6, 1953 |